(12) United States Patent
Kim et al.

(10) Patent No.: US 11,190,912 B2
(45) Date of Patent: Nov. 30, 2021

(54) ELECTRONIC DEVICE AND METHOD OF CONTROLLING ELECTRONIC DEVICE

(71) Applicant: Samsung Electronics Co., Ltd., Suwon-si (KR)

(72) Inventors: Kyungdong Kim, Suwon-si (KR); Cholwoo Lee, Suwon-si (KR); Wooseok Jang, Suwon-si (KR); Dongho Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/415,429

(22) Filed: May 17, 2019

(65) Prior Publication Data

US 2019/0357021 A1 Nov. 21, 2019

(30) Foreign Application Priority Data

May 17, 2018 (KR) .......................... 10-2018-0056557

(51) Int. Cl.
*H04W 4/20* (2018.01)
*G08B 5/22* (2006.01)
*H04B 1/3827* (2015.01)

(52) U.S. Cl.
CPC .............. *H04W 4/20* (2013.01); *G08B 5/228* (2013.01); *H04B 1/385* (2013.01)

(58) Field of Classification Search
CPC ........... H04M 1/7253; H04M 2250/12; H04M 19/04; H04M 1/72569; H04M 1/67; H04M 2250/02; H04M 1/725; H04M 1/72552; H04M 1/72527; H04M 1/72577; H04M 19/047; H04M 1/0258; H04M 1/6066;
(Continued)

(56) References Cited

U.S. PATENT DOCUMENTS

2014/0313863 A1 10/2014 Lee et al.
2014/0334271 A1 11/2014 Park et al.
(Continued)

FOREIGN PATENT DOCUMENTS

CN 101866152 A 10/2010
CN 104427101 A 3/2015
(Continued)

OTHER PUBLICATIONS

International Search Report and Written Opinion dated Aug. 21, 2019, issued in an International application No. PCT/KR2019/005958.
(Continued)

*Primary Examiner* — Golam Sorowar
(74) *Attorney, Agent, or Firm* — Jefferson IP Law, LLP

(57) ABSTRACT

An electronic device for changing a notification mode and a method therefor are provided. The electronic device includes communication circuitry, at least one processor, and a memory. The memory stores instructions, when executed, configured to cause the at least one processor to establish communication with a wearable device through the communication circuitry, and upon identifying a change in an operation state of the wearable device, change from a first notification mode of the electronic device to a second notification mode according to the identified operation state of the wearable device.

21 Claims, 9 Drawing Sheets

(58) Field of Classification Search
CPC .............. H04M 1/673; H04M 1/72519; H04M 1/72558; H04M 1/72563; H04M 1/72566; H04M 2203/6018; G06F 1/163; G06F 3/017; G06F 21/35; G06F 3/014; G06F 1/1626; G06F 1/1694; G06F 1/3215; G06F 21/32; G06F 3/011; G06F 3/016; G06F 3/0346; G06F 3/041; G06F 3/1423; G06F 3/16; G06F 3/167; G06F 9/4411; G06F 1/16; G06F 1/1632; G06F 1/169; G06F 1/1698; H04W 4/80; H04W 88/02; H04W 12/06; H04W 4/12; H04W 68/005; H04W 8/005; H04W 4/023; H04W 4/70; H04W 76/14; H04W 84/18; H04W 12/003; H04W 12/00503; H04W 12/00508; H04W 12/08; H04W 12/12; H04W 12/1206; H04W 36/03; H04W 4/022; H04W 4/20; H04W 4/21
See application file for complete search history.

(56) References Cited

U.S. PATENT DOCUMENTS

| | | | |
|---|---|---|---|
| 2015/0039880 A1* | 2/2015 | Aminzade | H04M 1/72527 713/100 |
| 2015/0245299 A1* | 8/2015 | Lee | H04M 1/72454 370/311 |
| 2015/0341901 A1 | 11/2015 | Ryu et al. | |
| 2015/0358451 A1 | 12/2015 | Cronin | |
| 2015/0381800 A1 | 12/2015 | Lee | |
| 2016/0134997 A1* | 5/2016 | Guo | H04L 67/10 455/41.2 |
| 2016/0301649 A1 | 10/2016 | Faaborg et al. | |
| 2016/0357510 A1 | 12/2016 | Watson et al. | |
| 2017/0041769 A1 | 2/2017 | Shim | |
| 2017/0289329 A1* | 10/2017 | Yim | H04W 76/14 |
| 2017/0289956 A1 | 10/2017 | Hirozawa et al. | |

FOREIGN PATENT DOCUMENTS

| | | | |
|---|---|---|---|
| CN | 107566604 A | 1/2018 | |
| CN | 107683459 A | 2/2018 | |
| EP | 3 176 694 A1 | 6/2017 | |
| GN | 106100663 A | 11/2016 | |
| JP | 2004-147263 A | 5/2004 | |
| JP | 2009-164780 A | 7/2009 | |
| KR | 10-2014-0126027 A | 10/2014 | |
| KR | 10-2014-0132232 A | 11/2014 | |
| KR | 20150084190 A * | 7/2015 | |
| KR | 10-2016-0001166 A | 1/2016 | |
| KR | 20160001166 A * | 1/2016 | ........ H04M 1/72552 |
| KR | 10-2016-0062263 A | 6/2016 | |
| KR | 10-2017-0081896 A | 7/2017 | |
| KR | 20170081896 A * | 7/2017 | |
| KR | 10-2018-0032403 A | 3/2018 | |
| KR | 20180032403 A * | 3/2018 | |

OTHER PUBLICATIONS

Chinese Office Action dated Jan. 28, 2021, issued in Chinese Patent Application No. 201980028180.5.
Extended European Search Report dated Feb. 22, 2021, issued in European Patent Application No. 19804021.4.
Chinese Office Action dated Sep. 30, 2021, issued in Chinese Patent Application No. 201980028180.5.

* cited by examiner

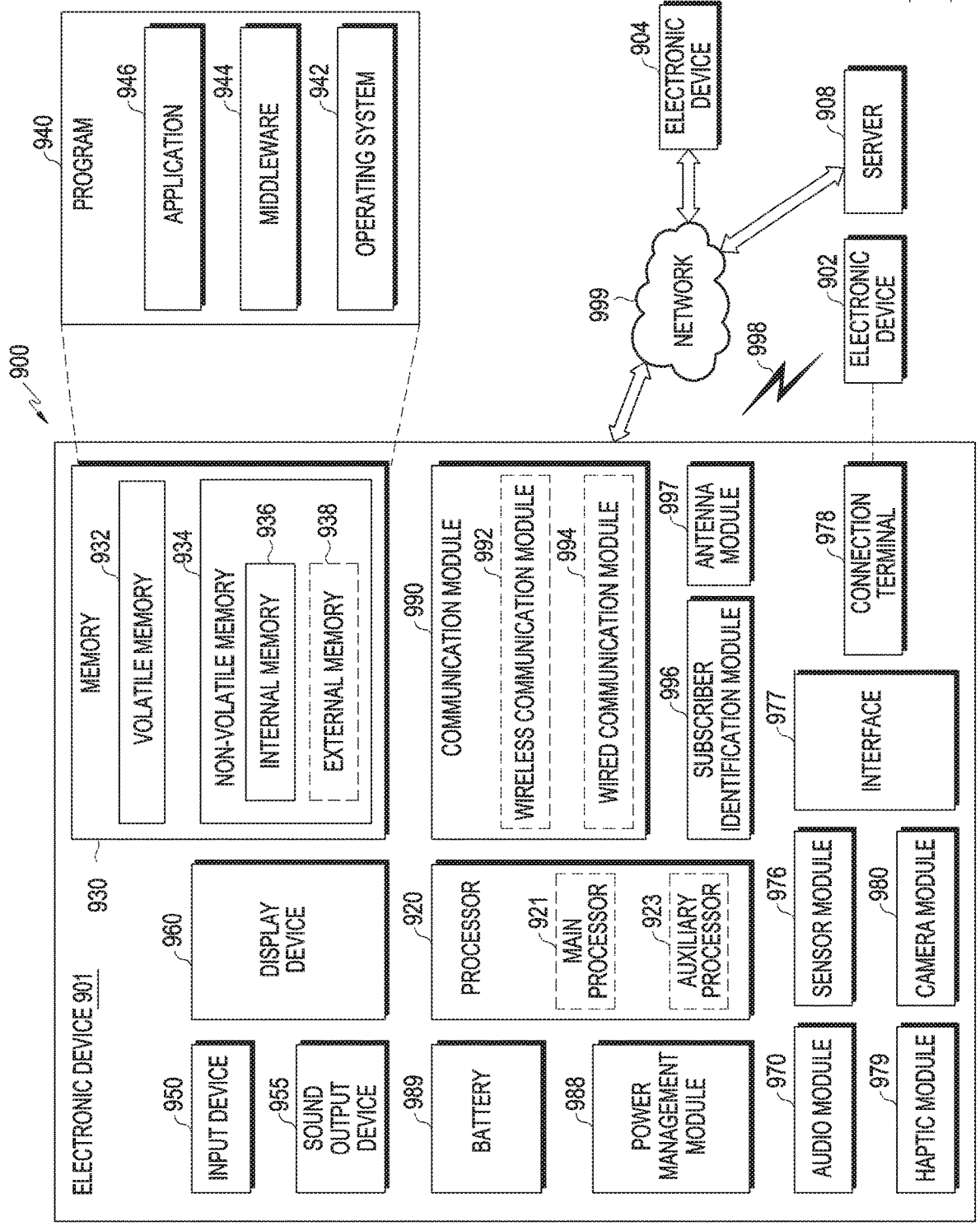

ELECTRONIC DEVICE AND METHOD OF CONTROLLING ELECTRONIC DEVICE

CROSS-REFERENCE TO RELATED APPLICATION(S)

This application is based on and claims priority under 35 U.S.C. § 119 of a Korean patent application number 10-2018-0056557, filed on May 17, 2018, in the Korean Intellectual Property Office, the disclosure of which is incorporated by reference herein in its entirety.

BACKGROUND

1. Field

The disclosure relates to a technology for changing a notification mode of an electronic device.

2. Description of Related Art

As electronic devices such as smart phones come into general use, the supply of wearable devices (for example, smart watches) linked with the smart phones has also rapidly increased. Wearable devices may be connected to smart phones through wired or wireless communication and provide users with various functions or operations provided by the smart phones. Due to such convenience, the rate of supply of wearable electronic devices such as smart watches has recently increased.

Electronic devices and wearable devices may generate notifications indicating reception of signals from the outside or generate notifications of events occurring inside to inform users. The notifications may use various methods such as vibration, sounds, and screen displays.

The above information is presented as background information only to assist with an understanding of the disclosure. No determination has been made, and no assertion is made, as to whether any of the above might be applicable as prior art with regard to the disclosure.

SUMMARY

When a user uses an electronic device and a wearable device which interwork with each other (in, for example, a companion mode), the user may receive a notification from the electronic device through the wearable device. For example, when the user is wearing the wearable device, the user may identify a notification through the wearable device. When the user is not wearing the wearable device, the user may identify a notification through the electronic device. Accordingly, the user may desire to differently configure the notification mode of the electronic device depending on whether the user is wearing the wearable device or not. To this end, it may be troublesome for the user to change the notification mode of the electronic device according to whether the user is wearing the wearable device or whether communication between the wearable device and the electronic device is connected.

Aspects of the disclosure are to address at least the above-mentioned problems and/or disadvantages and to provide at least the advantages described below. Accordingly, an aspect of the disclosure is to provide an electronic device for changing a notification mode.

Additional aspects will be set forth in part in the description which follows and, in part, will be apparent from the description, or may be learned by practice of the presented embodiments.

In accordance with an aspect of the disclosure, an electronic device is provided. The electronic device includes communication circuitry, at least one processor, and a memory, wherein the memory stores instructions, when executed, cause the at least one processor to establish communication with a wearable device through the communication circuitry, and, upon identifying a change in an operation state of the wearable device, change from a first notification mode of the electronic device to a second notification mode according to the identified operation state of the wearable device.

In accordance with another aspect of the disclosure, a method of controlling an electronic device is provided. The method includes identifying a change in an operation state of a wearable device establishing communication with the electronic device and changing from a first notification mode of the electronic device to a second notification mode according to the identified operation state of the wearable device.

According to various embodiments of the disclosure, the notification mode of the electronic device may be changed according to whether the user is wearing the wearable device.

According to various embodiments of the disclosure, the notification mode of the electronic device may be changed depending on the state of communication between the wearable device and the electronic device.

According to various embodiments of the disclosure, when a notification mode according to an operation state of the wearable device is different from a notification mode according to a location of the electronic device, a notification mode may be set according to a priority.

According to various embodiments of the disclosure, when a notification mode according to an operation state of the wearable device is different from a notification mode according to a time, a notification mode may be set according to a priority.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a block diagram illustrating an electronic device within a network environment according to an embodiment of the disclosure.

Throughout the drawings, it should be noted that like reference numbers are used to depict the same or similar elements, features, and structures.

DETAILED DESCRIPTION

Figure 1A:
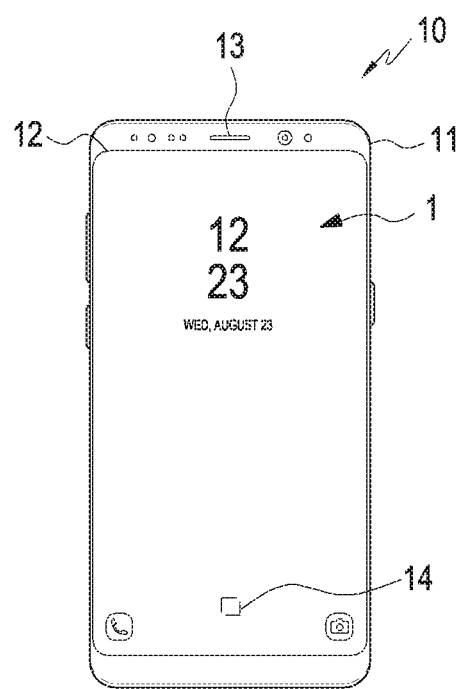
FIG. 1A illustrates the appearance of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, various embodiments of the disclosure will be described with reference to the accompanying drawings.

FIG. 1A illustrates the appearance of an electronic device according to an embodiment of the disclosure.

Figure 1B:
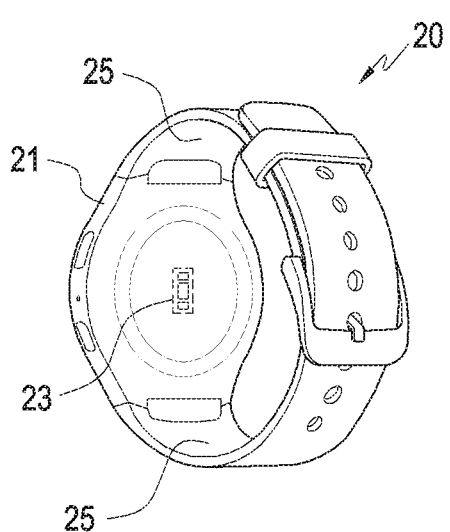
FIG. 1B illustrates the appearance of a wearable device according to an embodiment of the disclosure.

FIG. 1B illustrates the appearance of a wearable device according to an embodiment of the disclosure.

Referring to FIG. 1A, an electronic device 10 according to an embodiment of the disclosure may include a housing 11, a display 12, or a speaker 13.

The housing 11 may provide a space for accommodating elements (for example, the display 12 or the speaker 13). The housing 11 may be implemented in various forms.

The display 12 may be located on a front surface 1 of the housing 11. The display 12 may be a touch-screen type that overlaps a touch panel. According to an embodiment, the display 12 may include a curved surface. For example, the display 12 may include a curved surface in an edge area close to a corner.

According to an embodiment, a speaker 13 for outputting a voice signal may be located above the display 12 disposed on the front surface 1 of the housing 11. A home key 14 in a soft-key type may be located in a display area on the lower part of the display 12. However, the form of the home key 14 is not limited thereto. For example, the electronic device 10 may include a separate physical key disposed in an area of the front surface of the electronic device 10, and the separate physical key may serve as the home key.

According to an embodiment, the electronic device 10 may include components for performing various functions near the speaker 13. According to an embodiment, the components may include at least one sensor module. For example, at least one of an illumination sensor (for example, an optical sensor), a proximity sensor, an infrared sensor, or an ultrasonic sensor may be included. According to an embodiment, the components may include a light-emitting diode (LED) indicator for showing state information of the electronic device 10 to the user.

Referring to FIG. 1B, the wearable device 20 according to an embodiment of the disclosure may include a housing 21, a strap 25, a display (not shown), or a sensor module 23.

The housing 21 may provide, for example, a space for accommodating elements (for example, the display and the sensor module 23). The housing 21 may be implemented in various forms. FIG. 1B illustrates an example in which the housing 21 is implemented in a circular form which can be attached to a user's body part, but is not limited thereto.

The display may be used to provide information processed by the wearable device 20. According to various embodiments, the display may be exposed through part of the front surface of the housing 21 in order to provide information processed by the wearable device 20.

The strap 25 may be connected to one end and the other end of the housing 21. The user may wear the wearable device 20 on his/her wrist using the strap 25.

The sensor module 23 may be used to measure biometric information of the user of the wearable device 20. The sensor module 23 may be exposed through the part of the rear surface or the front surface of the housing 21 in order to take the pulse of the user of the wearable device 20. According to various embodiments, the sensor module 23 may be located on the strap 25 of the wearable device. The rear surface may be a surface opposite the front surface. For example, in FIG. 1B, the surface on which the sensor module 23 is disposed is the rear surface and the surface on which the display is disposed is the front surface. However, the disclosure is not limited thereto.

Figure 2A:
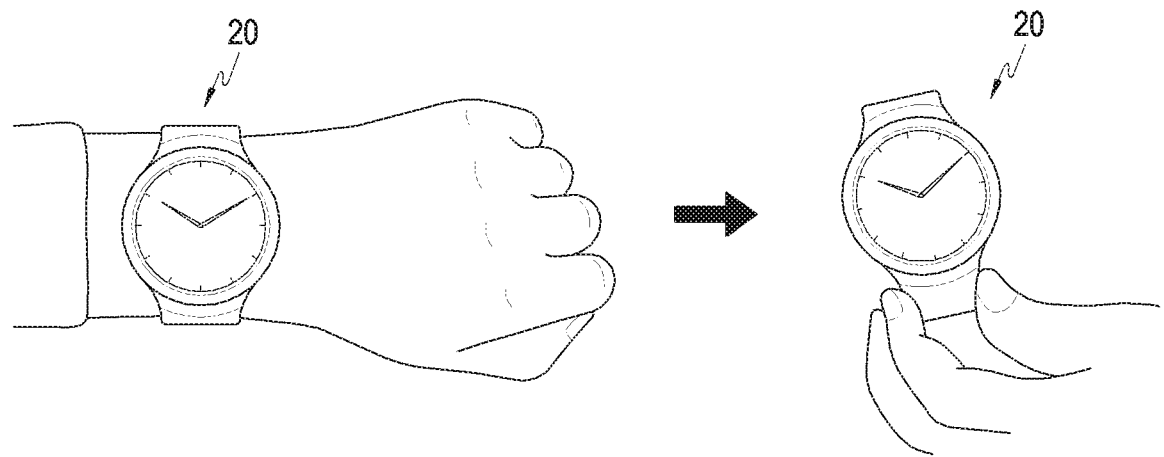
FIG. 2A illustrates a situation in which a notification mode of the electronic device is changed according to a change in an operation state of the wearable device according to an embodiment of the disclosure.

FIG. 2A illustrates the situation in which a notification mode of the electronic device is changed according to a change in an operation state of the wearable device according to an embodiment of the disclosure.

Figure 2B:
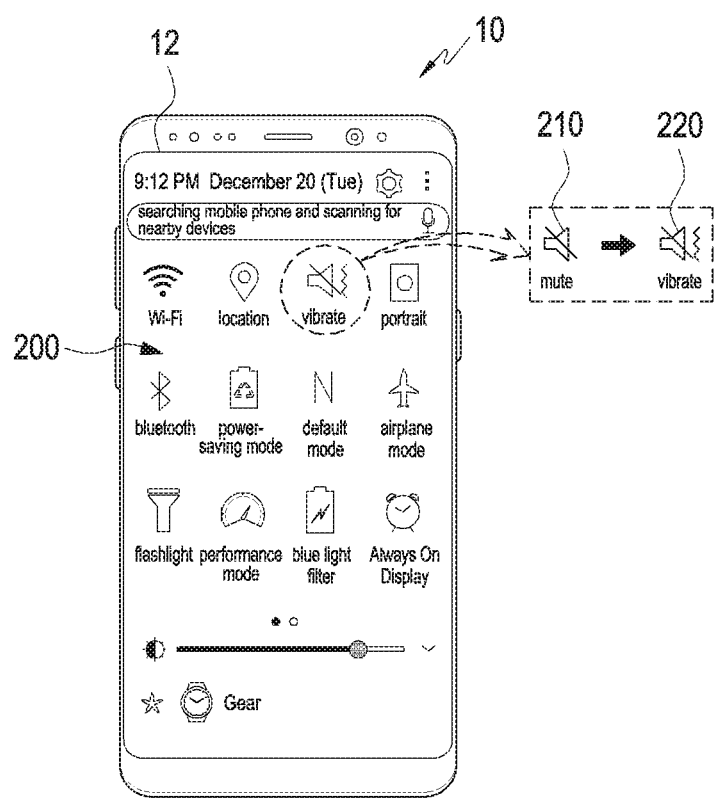
FIG. 2B illustrates a situation in which a notification mode of the electronic device is changed according to a change in an operation state of the wearable device according to an embodiment of the disclosure.

FIG. 2B illustrates the situation in which a notification mode of the electronic device is changed according to a change in an operation state of the wearable device according to an embodiment of the disclosure.

Referring to FIGS. 2A and 2B, the electronic device 10 and the wearable device 20 may establish communication therebetween. For example, the electronic device 10 and the wearable device 20 may establish wired or wireless communication. To this end, each of the electronic device 10 and the wearable device 20 may include a communication module (e.g., communication circuitry or a transceiver).

According to various embodiments, the communication module included in each of the electronic device 10 and the wearable device 20 may construct a direct (for example, wired) communication channel or a wireless communication channel between the electronic device 10 and the wearable device 20 and support communication through the constructed communication channel. Each communication module may operate independently from a processor included in the electronic device 10 and the wearable device 20 and may include one or more communication processors supporting direct (for example, wired) communication or wireless communication.

According to an embodiment, the communication module may include a wireless communication module (for example, a cellular communication module, a short-range wireless communication module, or a global navigation satellite system (GNSS) communication module) or a wired communication module (for example, a local area network (LAN) communication module or a power-line communication module). Among the communication modules, the corresponding communication module may perform mutual communication through a first network (for example, a short-range communication network such as Bluetooth, Wi-Fi, direct or Infrared Data Association (IrDA)) or a second network (for example, a long-range communication network such as a cellular network, the Internet, or a computer network (for example, a LAN or wide area network (WAN)).

According to various embodiments, the wearable device 20 may establish communication with the electronic device 10 through the first network and may transmit and receive data or signals. Alternatively, the wearable device 20 may establish communication with the electronic device 10 through the first network or the second network and may transmit and receive data or signals while independently communicating with an external device through the second network.

Various types of communication modules may be integrated into one element (for example, a single chip) or may be implemented as a plurality of separate elements (for example, a plurality of chips).

According to an embodiment, after communication is established, when the change in the operation state of the wearable device 20 is identified, the electronic device 10 may change a preset notification mode according to the identified operation state.

The operation state of the wearable device 20 may be at least one of, for example, whether the user wears the wearable device 20 or a state of communication with the electronic device 10.

According to an embodiment, the electronic device 10 may identify whether the user wears the wearable device 20.

For example, the wearable device 20 may identify whether the user wears the wearable device 20 through a sensor module (for example, the sensor module (sensor module 23) of FIGS. 1A and 1B). The electronic device 10 may receive information about a change in the wearing state of the wearable device 20 by the user from the wearable device 20.

According to an embodiment, the electronic device 10 may identify a change in the communication state of the wearable device 20.

For example, the electronic device 10 may determine that communication is established when regular transmission/reception of data or signals to/from the wearable device 20 starts. Alternatively, the electronic device 10 may determine that communication starts when the electronic device 10 receives notification of the start of the communication state from the wearable device 20.

For example, when regular transmission/reception of data or signals to/from the wearable device 20 stops, the electronic device 10 may identify that the communication state ends. Alternatively, when notification of the end of the communication state is received from the wearable device 20, the electronic device 10 may determine that communication ends.

A notification mode may be an operation for notifying the user that an event is generated or a signal is received when the event is generated inside the electronic device 10 or the signal is received from the outside. The notification mode provided by the electronic device 10 may include, for example, a vibration mode, a sound mode, a mute mode, or at least one of vibration and sound modes. The vibration mode may be, for example, a mode of vibrating a haptic module (or a vibration module) to provide a notification in order to inform the user of generation of an event or reception of a signal. The sound mode may be, for example, a mode of outputting a sound set in a speaker included in the electronic device 10 in order to inform the user of generation of an event or reception of a signal. The mute mode may be, for example, a mode of displaying objects related to a notification on the display 12 in order to inform the user of generation of an event or reception of a signal.

When the change in the operation state of the wearable device 20 is identified, the electronic device 10 according to an embodiment may change from a currently set first notification mode to a second notification mode different from the current notification mode.

FIG. 2A illustrates the situation in which an operation state of the wearable device 20 is changed.

Referring to FIG. 2A, the wearable device 20 according to an embodiment may identify a state in which the wearable device 20 is worn on a user's body part and a state in which the wearable device 20 is removed from the user's body part through a sensor module (for example, the sensor module 23 of FIGS. 1A and 1B). For example, the wearable device 20 may identify whether or not the wearable device 20 is worn on the basis of a sensing value detected by a proximity sensor included in a sensor module (for example, the sensor module 23 of FIGS. 1A and 1B) for detecting whether the wearable device is in proximity to the user's body part.

Referring to FIG. 2A, the wearable device 20 may be in a state in which the wearable device 20 has been worn on the user's body part (for example, the wrist) and was then removed therefrom. The wearable device 20 may transmit a signal indicating a change in the operation state (for example, a change in the wearing state) to the electronic device 10. According to various embodiments, the wearable device 20 may add content about the change in the operation state to periodically transmitted/received data for data synchronization with the electronic device 10. For example, the wearable device 20 may transmit measured health-related data to the electronic device 10 according to a predetermined period. In this case, information related to the changed operation state of the wearable device 20 may be also transmitted to the electronic device 10.

Referring to FIG. 2B, the electronic device 10 may change the notification mode according to the received change in the operation state of the wearable device 20.

According to an embodiment, the electronic device 10 may identify the signal received from the wearable device 20 and may determine that the wearable device 20 is being removed from or is no longer being worn on the user's body part (for example, the wrist). The electronic device 10 may change from a currently set first notification mode (for example, a mute mode) to a second notification mode (for example, a vibration mode) different from the first notification mode according to the identified signal.

In this case, the electronic device 10 may change a mute mode icon 210 indicating the mute mode displayed on a notification window 200 into a vibration mode icon 220 indicating the vibration mode and display the vibration mode icon 220 on the display 12.

According to various embodiments, the electronic device 10 may change from the first notification mode to the second notification mode on the basis of a predetermined notification mode corresponding to operation states of the wearable device 20. For example, when the wearable device 20 is worn on the user's body part (for example, the wrist), a predetermined notification mode of the electronic device 10 may be a mute mode. In another example, when the wearable device 20 is removed from the user's body part, a predetermined notification mode of the electronic device 10 may be a vibration mode. According to various embodiments, the electronic device 10 may set, in advance, the notification mode of the electronic device 10 according to the change in the operation state of the wearable device 20. This will be described with reference to FIGS. 5A and 5B.

According to various embodiments, when the change in the operation state of the wearable device 20 is maintained for a predetermined time, the electronic device 10 may change the notification mode. For example, the electronic device 10 may receive a signal from the wearable device 20 indicating removal from the user's body part. When the signal indicating that the wearable device 20 is removed from the user's body part is received for a predetermined time or longer or when the signal indicating removal is received and the state is maintained for a predetermined time or longer, the electronic device 10 may change from the first notification mode (for example, the mute mode) to the second notification mode (for example, the vibration mode). For example, when the signal indicating that the wearable device 20 is removed from the user's body part is received for 5 minutes or longer or when the signal indicating removal is received and the state is maintained for 5 minutes or longer, the electronic device 10 may change from the first notification mode (for example, the mute mode) to the second notification mode (for example, the vibration mode). However, the predetermined time is not limited thereto. For example, the predetermined time may be 10 minutes, 20 minutes, or 30 minutes. Further, the electronic device 10 may provide a user interface through which the user can configure the predetermined time.

According to various embodiments, the electronic device 10 may change from the second notification mode, which has been changed from the first notification mode, to a third notification mode according to the state of the electronic device 10. For example, in FIG. 2B, when it is identified that the electronic device 10 is in a power-saving mode, the electronic device 10 may change from a vibration mode (for example, the second notification mode) to a sound mode (for example, the third notification mode) to improve efficiency of battery use by the electronic device 10.

According to various embodiments of the disclosure, when the user temporarily removes the wearable device, the change in the notification mode of the electronic device 10 may be prevented.

Since the electronic device 10 according to an embodiment of the disclosure changes the notification mode according to the change in the operation state of the wearable device 20, it is possible to reduce the bother of changing the notification mode of the electronic device 10 whenever the user removes the wearable device.

Since the electronic device 10 according to an embodiment of the disclosure changes the notification mode according to the change in the operation state of the wearable device 20, it is possible to reduce the frequency with which incoming calls and messages are missed by the user.

Figure 3A:
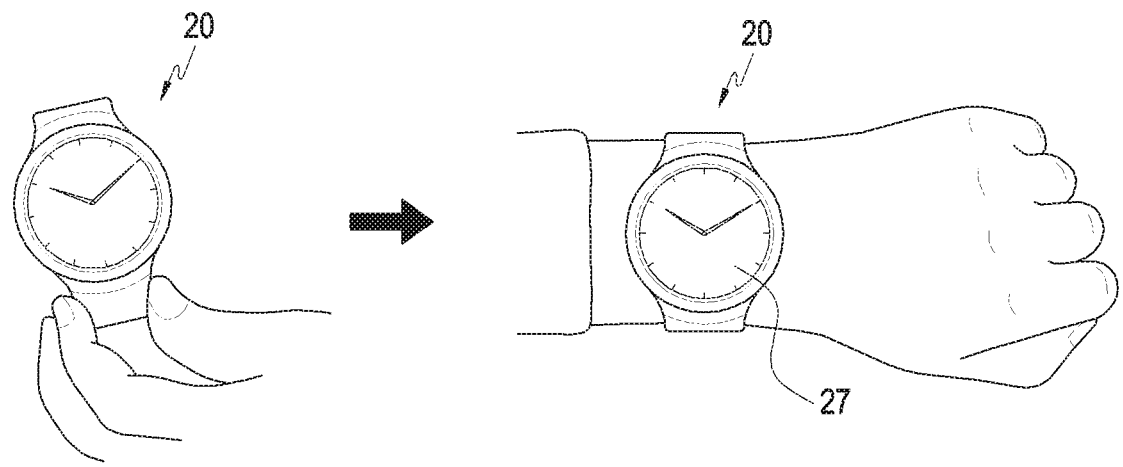
FIG. 3A illustrates a situation in which the electronic device displays information indicating a change in a notification mode according to a change in the operation mode of the wearable device according to an embodiment of the disclosure.

FIG. 3A illustrates the situation in which the electronic device displays information indicating a change in a notification mode according to a change in the operation mode of the wearable device according to an embodiment of the disclosure.

Figure 3B:
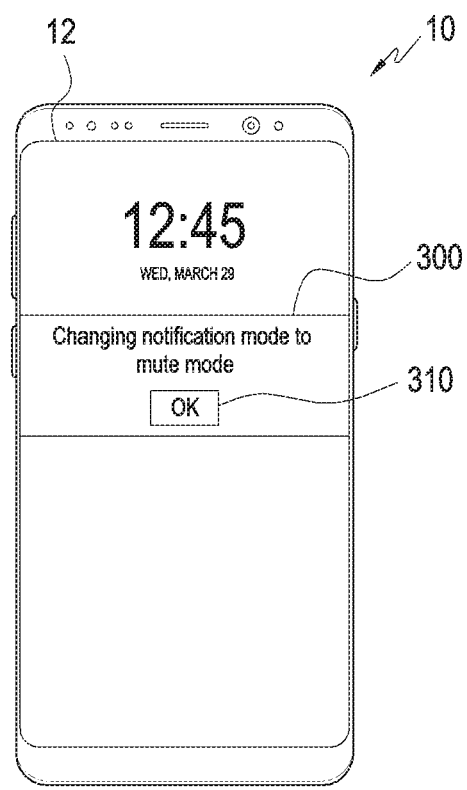
FIG. 3B illustrates a situation in which the electronic device displays information indicating a change in a notification mode according to a change in the operation mode of the wearable device according to an embodiment of the disclosure.

FIG. 3B illustrates the situation in which the electronic device displays information indicating a change in a notification mode according to a change in the operation mode of the wearable device according to an embodiment of the disclosure.

Referring to FIGS. 3A and 3B, the electronic device 10 and the wearable device 20 may establish communication therebetween. For example, the electronic device 10 and the wearable device 20 may establish wired or wireless communication. To this end, each of the electronic device 10 and the wearable device 20 may include a communication module.

According to an embodiment, after establishing communication, the electronic device 10 and the wearable device 20 may transmit and receive information on the operation state of each thereof. For example, upon receiving a signal indicating the change in the operation state of the wearable device 20, the electronic device 10 may change the set notification mode according to the received operation state.

When the reception of the signal indicating the change in the operation state of the wearable device 20 is identified, the electronic device 10 according to an embodiment may change from the currently set first notification mode to the second notification mode, which is different from the current notification mode.

FIG. 3A illustrates the situation in which the operation state of the wearable device 20 is changed.

Referring to FIG. 3A, the wearable device 20 according to an embodiment may identify the state in which the wearable device 20 is worn on the user's body part and the state in which the wearable device 20 is removed from the user's body part through a sensor module (for example, the sensor module 23 of FIGS. 1A and 1B). For example, the wearable device 20 may identify whether or not the wearable device 20 is worn on the basis of a sensing value detected by a proximity sensor included in a sensor module (for example, the sensor module 23 of FIGS. 1A and 1B) for detecting whether the wearable device is in proximity to the user's body part.

Referring to FIG. 3A, the wearable device 20 may change from the state of not being worn to the state in which the wearable device 20 is worn on the user's body part (for example, the wrist). The wearable device 20 may transmit a signal indicating a change in the operation state (for example, a change in the wearing state) to the electronic device 10.

Referring to FIG. 3B, the electronic device 10 may display information indicating a change in the notification mode according to the received change in the operation state of the wearable device 20 on the display 12.

According to an embodiment, the electronic device 10 may identify a signal received from the wearable device 20 and determine that the wearable device 20 is in the state in which the wearable device 20 is worn on the user's body part (for example, the wrist) from the state in which the wearing thereof is released. The electronic device 10 may generate information indicating a change from the currently set first notification mode (for example, a vibration mode) to the second notification mode (for example, a mute mode) different from the first notification mode according to the identified signal.

For example, the electronic device 10 may display notification mode change information 300 indicating that the change in the notification mode will be made in the form of a popup information window on the display 12. However, the disclosure is not limited thereto. For example, the electronic device 10 may generate and output a voice or vibration indicating generation of the change in the notification mode.

According to various embodiments, when the electronic device 101 identifies that the user acknowledges the information on the change in the notification mode displayed on the display 12, the electronic device 10 may change the notification mode. For example, when the user touches "OK" 310 displayed in the notification mode change information 300 in the form of the popup information window, the electronic device 10 may identify that the user acknowledges the notification mode change information. When there is no acknowledgement by the user, the electronic device 10 may continuously maintain the existing notification mode.

However, the disclosure is not limited thereto. According to various embodiments, when the user does not touch "OK" 310 for a predetermined time (for example, 5 minutes or longer), the electronic device 10 may change the notification mode.

According to various embodiments, the electronic device 10 may display a popup information window including an additional function. For example, the popup information window may display the notification mode change information 300 and a function execution object for changing the notification mode of the electronic device 10 together. The user may maintain an automatically changed notification mode or may select a function execution object in order to additionally change a notification mode of the electronic device 10.

According to various embodiments, the wearable device 20 may output mode change information indicating the change in the notification mode of the electronic device 10. For example, the wearable device 20 may display mode change information indicating the change in the notification mode of the electronic device 10 in the form of a popup information window on the display 27 of the wearable device. Further, the wearable device 20 may generate and output a voice or vibration indicating the change in the notification mode of the electronic device 10.

According to various embodiments, when the change in the operation state of the wearable device 20 is maintained for a predetermined time, the electronic device 10 may change the notification mode. For example, the electronic device 10 may receive a signal indicating that the wearable device 20 is worn on the user's body part from the wearable device 20. When the signal indicating that the wearable device 20 is worn on the user's body part is received for a predetermined time or longer or when the signal indicating the wearing is received and the state is maintained for a predetermined time or longer, the electronic device 10 may change from the first notification mode (for example, the sound mode) to the second notification mode (for example, the mute mode). For example, when the signal indicating that the wearable device 20 is worn on the user's body part is received for 1 minute or longer or when the indicating the wearing is received and the state is maintained for 1 minute or longer, the electronic device 10 may change from the first notification mode (for example, the sound mode) to the second notification mode (for example, the mute mode). However, the predetermined time is not limited thereto. For example, the predetermined time may be 5 minutes or 10 minutes. Further, the electronic device 10 may provide a user interface through which the user can configure the predetermined time.

Figure 4A:
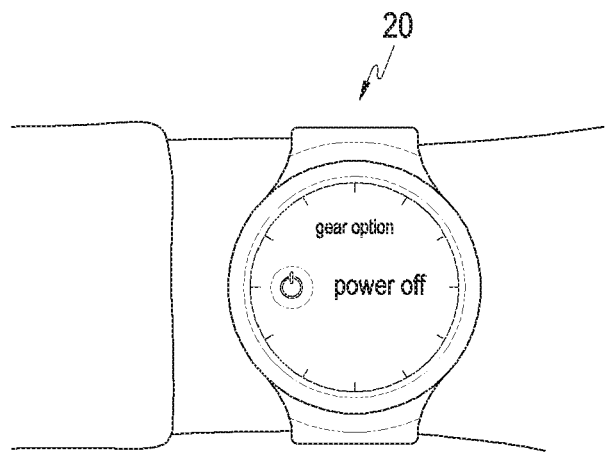
FIG. 4A illustrates another embodiment in which the notification mode of the electronic device is changed on the basis of a change in the operation state of the wearable device according to an embodiment of the disclosure.

FIG. 4A illustrates another embodiment in which the notification mode of the electronic device is changed on the basis of a change in the operation state of the wearable device according to an embodiment of the disclosure.

Figure 4B:
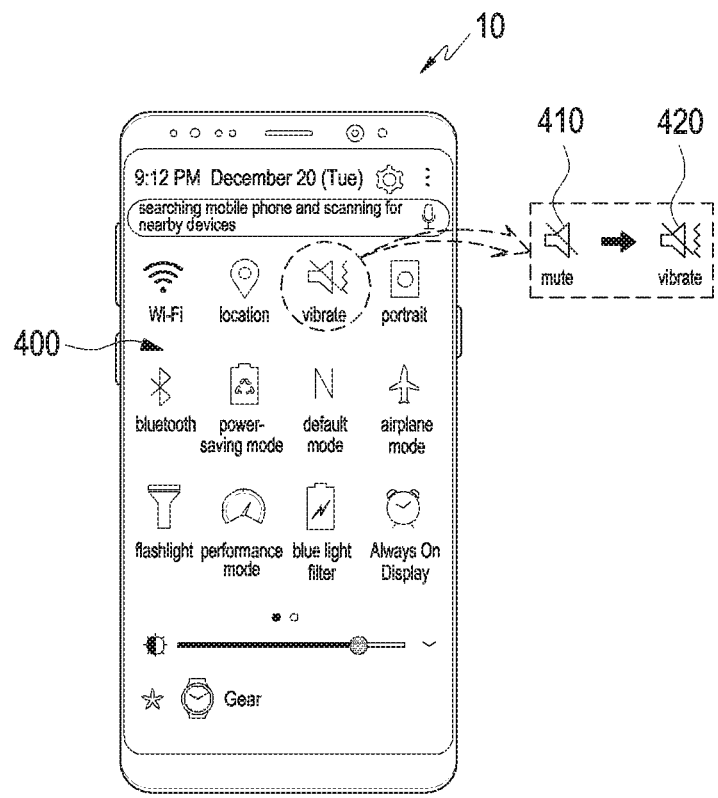
FIG. 4B illustrates another embodiment in which the notification mode of the electronic device is changed on the basis of a change in the operation state of the wearable device according to an embodiment of the disclosure.

FIG. 4B illustrates another embodiment in which the notification mode of the electronic device is changed on the basis of a change in the operation state of the wearable device according to an embodiment of the disclosure.

FIG. 4A illustrates a situation in which the operation state of the wearable device 20 is changed.

Referring to FIG. 4A, the wearable device 20 according to an embodiment may be in a state in which power is turned off by a user input.

When the wearable device 20 is turned off, the electronic device 10 cannot transmit and receive data to and from the wearable device 20. When the electronic device 10 cannot transmit and receive data to and from the wearable device 20 for the reason such as turning off of the wearable device 20 or an increase in the physical distance between the wearable device 20 and the electronic device 10, the electronic device 10 may identify that the operation state of the wearable device 20 is changed (for example, that communication is disconnected).

Referring to FIG. 4B, the electronic device 10 may change the notification mode according to the identified change in the operation state of the wearable device 20 (for example, communication disconnection).

According to an embodiment, the electronic device 10 may identify that communication with the wearable device 20 is disconnected and change from the currently set first notification mode (for example, the mute mode) to the second notification mode (for example, the vibration mode), which is different from the first notification mode.

In this case, the electronic device 10 may change a mute mode icon 410 indicating the mute mode displayed in a notification window 400 into a vibration mode icon 420 indicating the vibration mode and display the vibration mode icon 420.

According to various embodiments, the electronic device 10 may generate information indicating that the change in the notification mode will be generated. For example, the electronic device 10 may display notification mode change information (for example, the notification mode change information 310 of FIGS. 3A and 3B), indicating the change in the notification mode, in the form of a popup window on the display 12. However, the disclosure is not limited thereto. For example, the electronic device 10 may generate and output a voice or vibration indicating the change in the notification mode.

According to various embodiments, when the change in the operation state of the wearable device 20 is maintained for a predetermined time, the electronic device 10 may change the notification mode. For example, the electronic device 10 may identify the situation in which no data is received from the wearable device 20. When the situation in which no data is received from the wearable device 20 continues for a predetermined time or longer, the electronic device 10 may change from the first notification mode (for example, the mute mode) to the second notification mode (for example, the vibration mode).

For example, when the situation in which no data is received from the wearable device 20 continues for 10 minutes or longer, the electronic device 10 may change from the first notification mode (for example, the mute mode) to the second notification mode (for example, the vibration mode). However, the predetermined time is not limited thereto. For example, the predetermined time may be 20 minutes or 30 minutes. Further, the electronic device 10 may provide a user interface through which the user can configure the predetermined time.

According to various embodiments, when the physical distance between the wearable device 20 and the electronic device 10 decreases or when the power of the wearable device 20 is turned on, the electronic device 10 may establish communication with the wearable device 20 again and transmit and receive data (for example, state information of the wearable device 20). In this case, the electronic device 10 may change the notification mode from the first mode (for example, the vibration mode) to the second mode (for example, the mute mode).

Figure 5A:
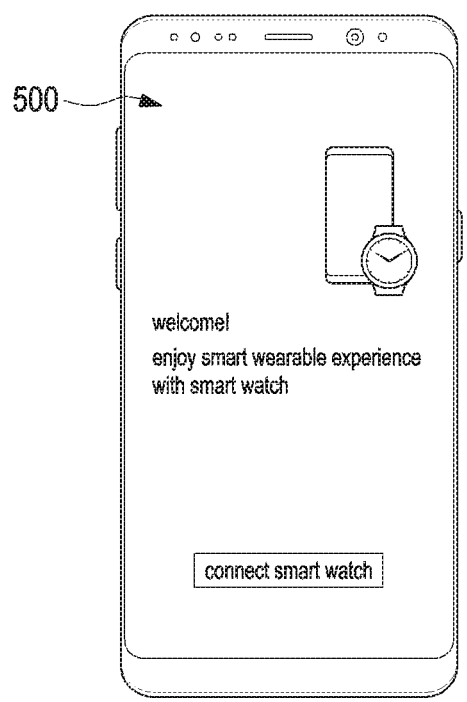
FIG. 5A illustrates a situation in which the electronic device sets a notification mode in accordance with an operation state of the wearable device according to an embodiment of the disclosure.

FIG. 5A illustrates the situation in which the electronic device sets a notification mode in accordance with an operation state of the wearable device according to an embodiment of the disclosure.

Figure 5B:
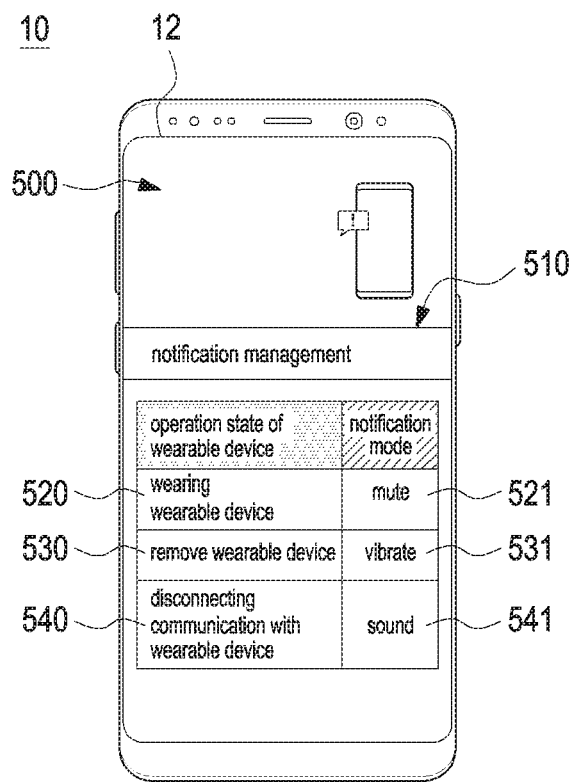
FIG. 5B illustrates a situation in which the electronic device sets a notification mode in accordance with an operation state of the wearable device according to an embodiment of the disclosure.

FIG. 5B illustrates the situation in which the electronic device sets a notification mode in accordance with an operation state of the wearable device according to an embodiment of the disclosure.

Referring to FIG. 5A, the electronic device 10 and the wearable device (for example, the wearable device 20 of FIGS. 1A and 1B) may establish communication therebetween. For example, the electronic device 10 and the wearable device (for example, the wearable device 20 of FIGS. 1A and 1B) may establish wired or wireless communication therebetween. To this end, each of the electronic device 10 and the wearable device (for example, the wearable device 20 of FIGS. 1A and 1B) may include a communication module.

According to an embodiment, when the electronic device 10 and the wearable device (for example, the wearable device 20 of FIGS. 1A and 1B) start communication, a wearable device management application 500 pre-stored in the electronic device 10 may be executed. According to various embodiments, when the wearable device management application 500 is not stored in the electronic device 10, the electronic device 10 may display a user interface for guiding download and installation of the wearable device management application 500 through a predetermined server (for example, Play Store™ or App Store™).

According to an embodiment, the wearable device management application 500 may guide the user to perform various configurations for the wearable device (for example, the wearable device 20 of FIGS. 1A and 1B) and the electronic device 10.

Referring to FIG. 5B, the wearable device management application 500 may display a notification-mode-setting user interface 510 for setting the notification mode of the electronic device 10 corresponding to the operation state of the wearable device 20 on the display 12.

According to an embodiment, the electronic device 10 may display a notification mode based on an operation state of the wearable device through the notification-mode-setting user interface 510. The notification-mode-setting user interface 510 may display, for example, a user interface for setting at least one of a notification mode 521 of the electronic device 10 corresponding to the case 520 in which the user wears the wearable device 20, a notification mode 531 of the electronic device 10 corresponding to the case 530 in which the user removes the wearable device 20, and a notification mode 541 of the electronic device 10 corresponding to the case 540 in which communication with the wearable device 20 is disconnected.

The user may select each of the items 521, 531, and 541 for displaying the notification modes and may input a desired notification mode. For example, when the user touches the items 521, 531, and 541 for displaying the notification modes, the notification-mode-setting user interface 510 may display a plurality of notification modes in the form of a popup window and determine a notification mode selected by the user as a notification mode of the corresponding item.

According to various embodiments, when the electronic device 10 initially establishes a communication relationship with the wearable device 20, the electronic device 10 may execute the wearable device management application and display the notification-mode-setting user interface. However, the disclosure is not limited thereto. For example, the user may change the notification mode corresponding to the operation state of the wearable device 20 through the wearable device management application even while the wearable device 20 and the electronic device 10 are in communication with each other.

Figure 6:
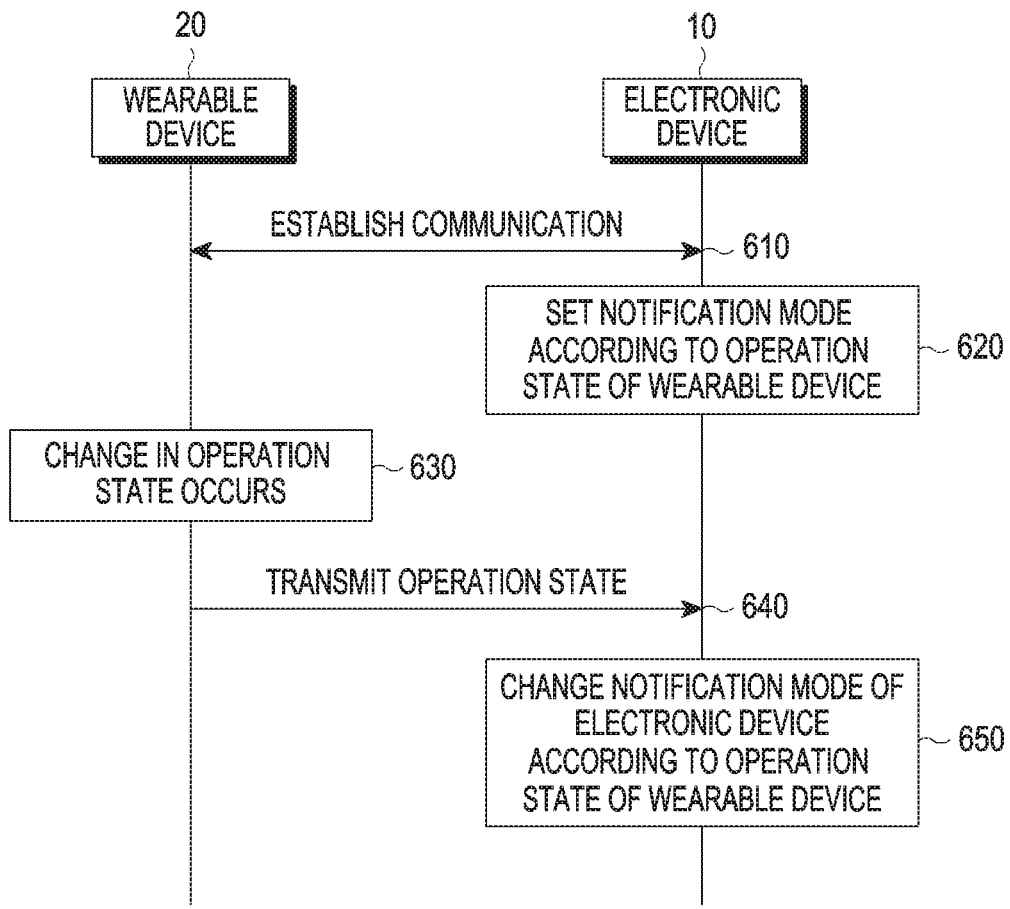
FIG. 6 is a flowchart illustrating a process of establishing communication between the electronic device and the wearable device and a change in the notification mode of the electronic device on the basis of a change in the operation state of the wearable device according to an embodiment of the disclosure.

FIG. 6 is a flowchart illustrating a process of establishing communication between the electronic device and the wearable device and a change in the notification mode of the electronic device on the basis of a change in the operation state of the wearable device according to an embodiment of the disclosure.

In operation 610, the electronic device 10 and the wearable device 20 may establish communication therebetween. According to an embodiment, the electronic device 10 and the wearable device 20 may establish wired or wireless communication therebetween. To this end, each of the electronic device 10 and the wearable device 20 may include a communication module (e.g., communication circuitry or a transceiver).

According to an embodiment, when the electronic device 10 and the wearable device 20 start communication, a wearable device management application designated for the electronic device 10 may be executed. The wearable device management application may guide the user to perform various configurations (for example, a communication type) for the wearable device 20 and the electronic device 10.

In operation 620, the electronic device 10 may set a notification mode corresponding to the operation state of the wearable device 20.

For example, the electronic device 10 may execute the wearable device management application. The wearable device management application may display a notification-mode-setting user interface for setting the notification mode of the electronic device 10 corresponding to the operation state of the wearable device 20.

The notification-mode-setting user interface may display, for example, a user interface for setting at least one of a notification mode of the electronic device 10 corresponding to the case in which the user wears the wearable device 20, a notification mode of the electronic device 10 corresponding to the case in which the user removes the wearable device 20, and a notification mode of the electronic device 10 corresponding to the case in which communication with the wearable device 20 is disconnected.

According to various embodiments, the electronic device 10 may set a notification mode corresponding to the operation state of the wearable device 20 in operation 620 and establish communication between the electronic device 10 and the wearable device 20.

In operation 630, a change in the operation state of the wearable device 20 may be generated. For example, the wearable device 20 may identify the state in which the wearable device 20 is worn on the user's body part (for example, the wrist) and the state of removal through a sensor module.

According to various embodiments, communication between the wearable device 20 and the electronic device 10 may be disconnected. For example, when the power of the wearable device 20 is turned off or when the physical distance between the electronic device 10 and the wearable device 20 increases, the communication between the wearable device 20 and the electronic device 10 may be disconnected.

In operation 640, the wearable device 20 may transmit the change in the operation state to the electronic device 10. For example, when the change in the operation state occurs, the wearable device 20 may transmit information on the occurrence thereof to the electronic device 10.

According to various embodiments, the wearable device 20 may add content about the change in the operation state to periodically transmitted/received data for data synchronization with the electronic device 10. For example, the wearable device 20 may transmit measured health-related data to the electronic device 10 according to a predetermined period. In this case, information related to the changed operation state of the wearable device 20 may be also transmitted to the electronic device 10.

According to various embodiments, the electronic device 10 may identify by itself the change in the operation state of the wearable device 20. For example, when communication between the electronic device 10 and the wearable device 20 is disconnected, the electronic device 10 may identify that there has been a change in the operation state of the wearable device 20.

In operation 650, the electronic device 10 may change the notification mode of the electronic device 10 according to the operation state of the wearable device 20. For example, the electronic device 10 may identify a signal received from the wearable device 20 and change from a currently set first notification mode into a second notification mode, different from the first notification mode, according to the identified signal.

According to various embodiments, when a regular signal (or data) is not received from the wearable device 20, the electronic device 10 may identify that the change in the operation state of the wearable device 20 is generated. For example, when data transmission and reception between the electronic device 10 and the wearable device 20 are disconnected due to turning off of the wearable device 20 or an increase in the physical distance between the wearable device 20 and the electronic device 10, the electronic device 10 may identify that the change in the operation state (for example, communication disconnection) of the wearable device 20 is generated and change the notification mode.

A method of controlling the electronic device 10 according to an embodiment may include an operation of identifying a change in an operation state of the wearable device 20 establishing communication with the electronic device 10, and an operation of changing from a first notification mode of the electronic device 10 to a second notification mode according to the identified operation state of the wearable device 20.

For the method of controlling the electronic device 10 according to an embodiment, the operation state of the wearable device 20 may include at least one of a state regarding whether a user wears the wearable device 20 and a state of communication between the wearable device 20 and the electronic device 10.

For the method of controlling the electronic device 10 according to an embodiment, the electronic device 10 may further include the display 12, and the method may include an operation of displaying information regarding a change in a notification mode of the electronic device 10 on the display 12.

The method of controlling the electronic device 10 according to an embodiment may include an operation of displaying a user interface including information for guiding setting of a type of a notification mode corresponding to a location of the electronic device 10.

The method of controlling the electronic device 10 according to an embodiment may include an operation of determining a notification mode of the electronic device 10 through a predetermined priority in a state in which the notification mode corresponding to the location of the electronic device 10 is different from the notification mode corresponding to the operation state of the wearable device 20.

The method of controlling the electronic device 10 according to an embodiment may include an operation of displaying a user interface including information to guide setting of a type of a notification mode corresponding to a time.

The method of controlling the electronic device 10 according to an embodiment may include an operation of determining a notification mode of the electronic device 10 through a predetermined priority in a state in which the notification mode corresponding to the time is different from the notification mode corresponding to the operation state of the wearable device 20.

The method of controlling the electronic device 10 according to an embodiment may include an operation of identifying that the wearable device 20 establishing communication with the electronic device 10 has been removed from a user's body part and an operation of changing from a first notification mode of the electronic device 10 to a second notification mode according to a result of the identification.

For the method of controlling the electronic device 10 according to an embodiment, the first notification mode may be a mute mode, and the second notification mode may be at least one of a vibration mode or a sound mode.

Figures 7A, 7B, 7C:
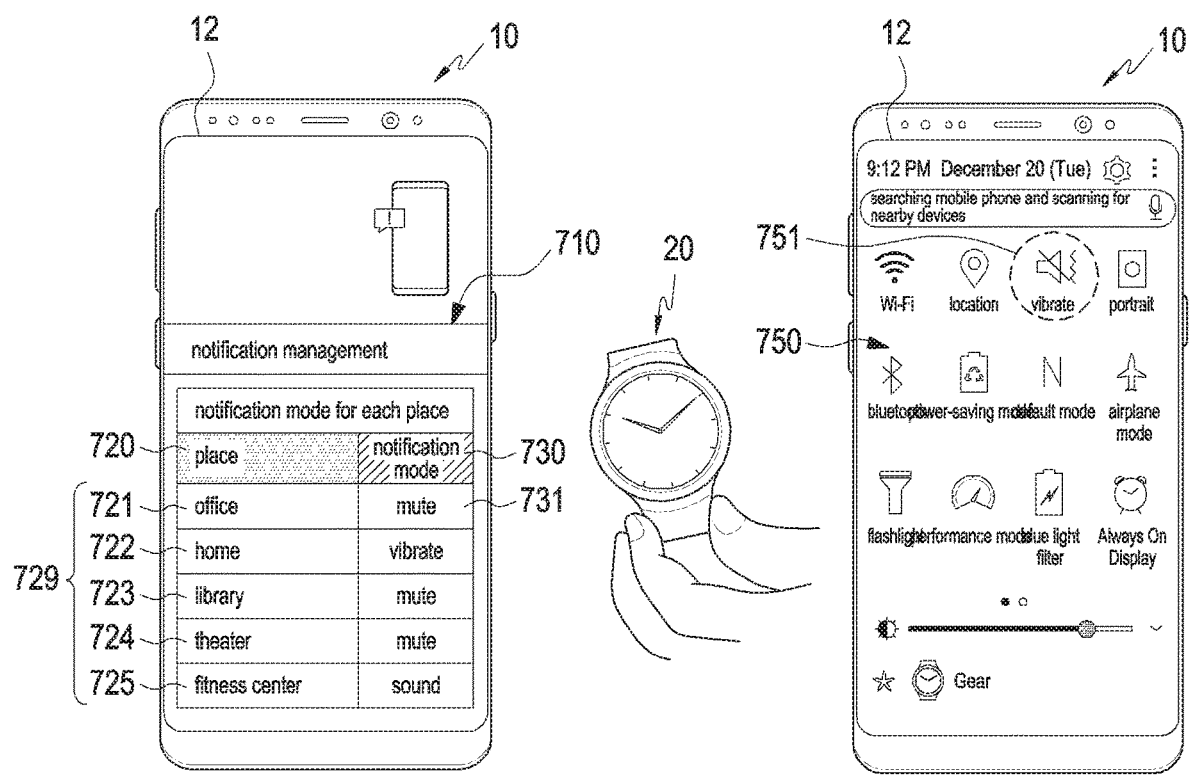
FIG. 7A illustrates a situation in which the electronic device selects one notification mode when a notification mode corresponding to a place is different from a notification mode corresponding to an operation state of the wearable device according to an embodiment of the disclosure.
FIG. 7B illustrates a situation in which the electronic device selects one notification mode when a notification mode corresponding to a place is different from a notification mode corresponding to an operation state of the wearable device according to an embodiment of the disclosure.
FIG. 7C illustrates a situation in which the electronic device selects one notification mode when a notification mode corresponding to a place is different from a notification mode corresponding to an operation state of the wearable device according to an embodiment of the disclosure.

FIG. 7A illustrates the situation in which the electronic device selects a notification mode on the basis of an operation state and place information of the wearable device according to an embodiment of the disclosure.

FIG. 7B illustrates the situation in which the electronic device selects a notification mode on the basis of an operation state and place information of the wearable device according to an embodiment of the disclosure.

FIG. 7C illustrates the situation in which the electronic device selects a notification mode on the basis of an operation state and place information of the wearable device according to an embodiment of the disclosure.

Referring to FIG. 7A, the electronic device 10 may display a user interface 710 for setting a notification mode of the electronic device 10 in accordance with a place in which the electronic device 10 is located on the display 12.

According to an embodiment, the user interface 710 may guide the user to store a place 720 and a notification mode 730 to correspond to each other. For example, the user may add an office 721 to the place 720 and determine the notification mode 730 therefor to be a mute mode 731.

For example, when the user selects "place" 720, the user interface 710 may display, on the display 12, a popup window where the name of a place, the address of the place, and the notification mode (for example, mute, sound, or vibration) for the place may be input.

The user may add an office to the names of the places and input an address corresponding to the office through the popup window. The user may input a notification mode in the office as the mute mode through the popup window.

When the name "office" or the name of the office, the address corresponding to the office, and the notification mode in the office are newly added through the popup window, the electronic device 10 may display the office 721 and the mute mode 731, determined as the notification mode in the office 721, in the user interface 710.

According to an embodiment, the electronic device 10 may add a home 722, a library 723, a theater 724, and a fitness center 725 to the place 720 through the above-described process and store the notification mode determined for each place.

According to various embodiments, the user interface 10 may identify the current location through a GPS included in the electronic device 10 and guide the user to add the location to a place list 729.

According to various embodiments, the electronic device 10 may identify a movement pattern of the electronic device 10 through the GPS and display a user interface for providing a list of places that can be registered to the user on the basis of the identified places. For example, the electronic device 10 may identify places in which the electronic device 10 stays for a long time among the places identified through the GPS and display a user interface for guiding the user to select one of the places and register the selected place as the place 720.

According to various embodiments, the electronic device 10 may accumulate data on notification modes set in the places in which the electronic device 10 has stayed, provide a plurality of notification modes set in the places to the user on the basis of the accumulated data, and then display a user interface for guiding the user to select the notification mode. However, the disclosure is not limited thereto. For example, the electronic device 10 may determine the notification mode that has been most frequently selected as the notification node corresponding to the corresponding place on the basis of the accumulated data.

FIG. 7B illustrates the situation in which the operation state of the wearable device 20 is changed.

Referring to FIG. 7B, the wearable device 20 according to an embodiment may identify the state in which the wearable device 20 is worn on the user's body part and the state of removal therefrom through a sensor module (for example, the sensor module 23 of FIGS. 1A and 1B). For example, the wearable device 20 may identify whether or not the wearable device 20 is being worn on the basis of a sensing value detected by a proximity sensor included in a sensor module (for example, the sensor module 23 of FIGS. 1A and 1B) for detecting whether the wearable device is in proximity to the user's body part.

Referring to FIG. 7B, the wearable device 20 may be in the state in which the wearable device 20 is no longer being worn on the user's body part (for example, the wrist). According to an embodiment, the wearable device 20 may transmit a signal indicating a change in the operation state (for example, whether the user wears the wearable device or a communication state) to the electronic device 10. According to an embodiment, the electronic device 10 may detect the change in the operation state of the wearable device 20 (for example, whether the user wears the wearable device or the communication state).

Referring to FIG. 7C, the electronic device 10 may determine a notification mode corresponding to the identified place.

For example, the place in which the electronic device 10 is located may be changed in the order of the office, the fitness center, and the home. The electronic device 10 may identify the place in which the electronic device 10 is located through the GPS and sequentially change the notification mode of the electronic device 10 in the order of the mute mode, the sound mode, and the vibration mode in accordance with each location.

In this case, the electronic device 10 may display a notification mode icon 751 displayed in a notification window 750 in accordance with the changed notification mode.

According to an embodiment, when the notification mode corresponding to the received operation state of the wearable device 20 is different from the notification mode corresponding to the place of the electronic device 10, the electronic device 10 may determine one notification mode according to a priority.

For example, when the notification mode corresponding to the operation state of the wearable device 20 is the vibration mode and the notification mode corresponding to the place of the electronic device 10 is the mute mode, the electronic device 10 may determine the notification mode according to the priority.

In this case, the electronic device 10 may display a notification mode icon 751 displayed in a notification window 750 in accordance with the changed notification mode.

According to an embodiment, the priority may be set by a manufacturer of the electronic device 10. Further, the electronic device 10 may provide a user interface through which the user sets the priority.

For example, the wearable device 20 may be in a state in which the wearable device 20 is removed from the user's body part (for example, the wrist). The electronic device 10 may prepare for the change of the notification mode to the vibration mode on the basis of the operation state received from the wearable device 20. Further, the electronic device 10 may identify that the place corresponding to the current location is the "office" and prepare to maintain the notification mode as the mute mode or change the same.

According to various embodiments, the electronic device 10 may set the notification mode preferentially on the basis of the operation state of the wearable device 20. Accordingly, in this case, the electronic device 10 may determine that the notification mode is the vibration mode.

According to various embodiments, the electronic device 10 may preferentially set the notification mode on the basis of the place in which the electronic device 10 is located. Accordingly, in this case, the electronic device 10 may determine that the notification mode is the mute mode.

Figures 8A, 8B, 8C:
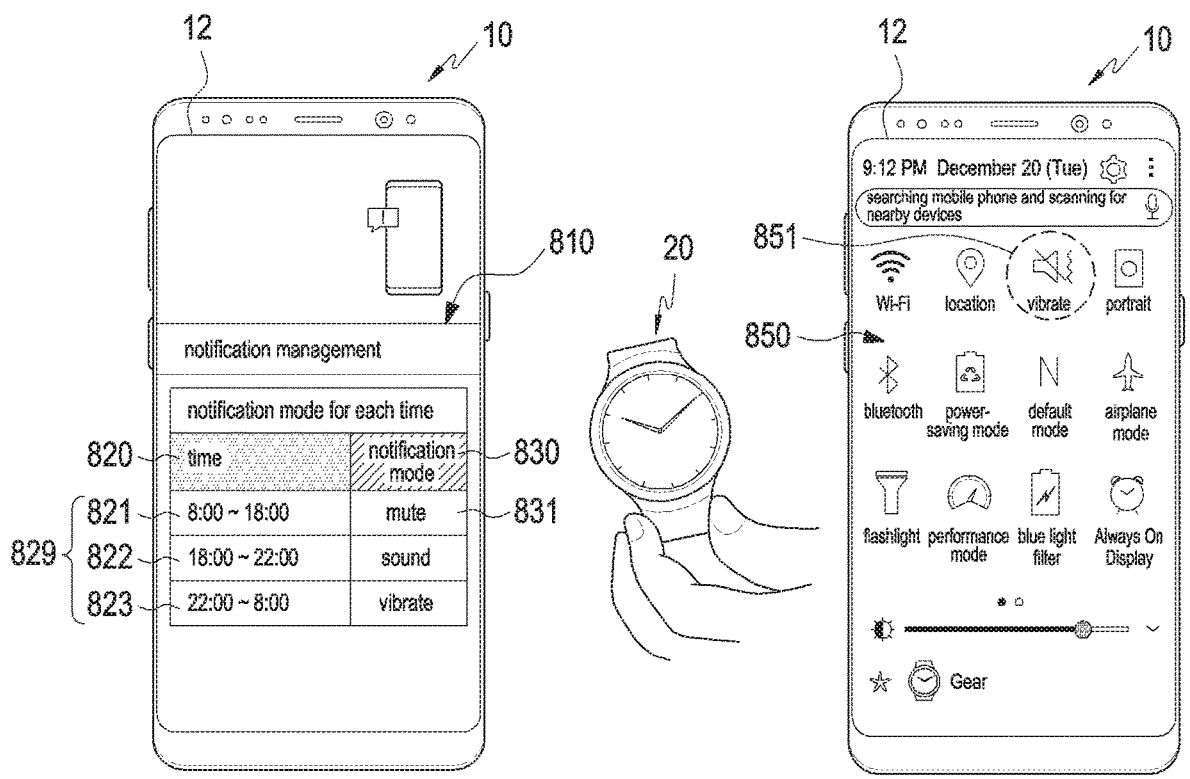
FIG. 8A illustrates a situation in which the electronic device selects one notification mode when a notification mode corresponding to a time is different from a notification mode corresponding to an operation state of the wearable device according to an embodiment of the disclosure.
FIG. 8B illustrates a situation in which the electronic device selects one notification mode when a notification mode corresponding to a time is different from a notification mode corresponding to an operation state of the wearable device according to an embodiment of the disclosure.
FIG. 8C illustrates a situation in which the electronic device selects one notification mode when a notification mode corresponding to a time is different from a notification mode corresponding to an operation state of the wearable device according to an embodiment of the disclosure.

FIG. 8A illustrates the situation in which the electronic device selects a notification mode on the basis of an operation state of the wearable device and a notification mode based on a time according to an embodiment of the disclosure.

FIG. 8B illustrates the situation in which the electronic device selects a notification mode on the basis of an operation state of the wearable device and a notification mode based on a time according to an embodiment of the disclosure.

FIG. 8C illustrates the situation in which the electronic device selects a notification mode on the basis of an operation state of the wearable device and a notification mode based on a time according to an embodiment of the disclosure.

Referring to FIG. 8A, the electronic device 10 may display a user interface 810 for setting a notification mode of the electronic device 10 in accordance with a time on the display 12.

According to an embodiment, the user interface 810 may guide the user to store a time 820 and a notification mode 830 to correspond to each other. For example, the user may add a time interval 821 from 8:00 to 18:00 to the time 820 and determine the notification mode 830 as a mute mode 831.

For example, when the user selects "time" 820, the user interface 810 may display a popup window for inputting a time interval to be added and a notification mode (for example, mute, sound, or vibration) in the time interval to be added on the display 12.

The user may add the time interval to be added and input the notification mode in the added time interval through the popup window. For example, the user may input the time interval from 8:00 to 18:00 and input the mute mode 831 as the notification mode in accordance with the time interval 821 from 8:00 to 18:00 through the popup window.

When the time interval from 8:00 to 18:00 and the notification mode in the corresponding time interval are newly added through the popup window, the electronic device 10 may display the time interval from 8:00 to 18:00 and the mute mode 831 determined as the notification mode in the corresponding time interval in the user interface 810.

According to an embodiment, the electronic device 10 may add a time interval 822 from 18:00 to 22:00 and a time interval 823 from 22:00 to 8:00 to the time 820 through the above-described process and store the notification mode 830 determined for each time interval.

According to various embodiments, the user interface 810 may guide the user to add the time interval to which the current time belongs to the time list 829. For example, the user may change the time interval in units of 1 hour or 30 minutes based on the current time and add the time interval to the time list 829.

According to various embodiments, the electronic device 10 may store the pattern by which the electronic device 10 has selected or changed notification modes in the form of data corresponding to time, provide a plurality of notification modes which are set for each time to the user on the basis of the accumulated data, and then display a user interface for guiding the user to perform selection. However, the disclosure is not limited thereto. For example, the electronic device 10 may determine the notification mode that has been most frequently selected as the notification mode of the corresponding time on the basis of the accumulated data.

FIG. 8B illustrates the situation in which the operation state of the wearable device 20 is changed.

Referring to FIG. 8B, the wearable device 20 according to an embodiment may identify the state in which the wearable device 20 is worn on the user's body part and the state of removal thereof through a sensor module (for example, the sensor module 23 of FIGS. 1A and 1B). For example, the wearable device 20 may identify whether or not the wearable device 20 is being worn on the basis of a sensing value detected by a proximity sensor included in a sensor module (for example, the sensor module 23 of FIGS. 1A and 1B) for detecting whether the wearable device is in proximity to the user's body part.

Referring to FIG. 8B, the wearable device 20 may be in the state in which the wearable device 20 is no longer being worn on the user's body part (for example, the wrist). According to an embodiment, the wearable device 20 may transmit a signal indicating a change in the operation state (for example, a change in the wearing state) to the electronic device 10. According to an embodiment, the electronic device 10 may detect the change in the operation state of the wearable device 20 (for example, power off or communication disconnection).

Referring to FIG. 8C, the electronic device 10 may determine a notification mode corresponding to the identified time.

For example, the electronic device 10 may identify that a first time interval 821 from 8:00 to 18:00, a second time interval 822 from 18:00 to 22:00 and a third time interval 823 from 22:00 to 8:00 The electronic device 10 may sequentially change the notification mode of the electronic device 10 in the order of the mute mode, the sound mode, and the vibration mode for each time interval.

In this case, the electronic device 10 may display a notification mode icon 851 displayed in a notification window 550 in accordance with the changed notification mode.

According to an embodiment, when the notification mode corresponding to the received operation state of the wearable device 20 is different from the notification mode corresponding to the current time, the electronic device 10 may determine one notification mode according to a priority.

For example, when the notification mode corresponding to the operation state of the wearable device 20 is the vibration mode and the notification mode corresponding to the time is the sound mode, the electronic device 10 may determine the notification mode according to the priority.

According to an embodiment, the priority may be set by the manufacturer of the electronic device 10. Further, the electronic device 10 may provide a user interface through which the user sets the priority.

For example, the wearable device 20 may be in the state in which the wearable device 20 is removed from the user's body part (for example, the wrist). The electronic device 10 may prepare to change the notification mode to the vibration mode on the basis of the operation state received from the wearable device 20. Further, the electronic device 10 may identify the current time (for example, 19:00) and prepare to maintain the notification mode as the sound mode or change the same.

In this case, when a predetermined priority is the notification mode corresponding to the operation state of the wearable device 20, the electronic device 10 may determine that the notification mode is the vibration mode. According to various embodiments, when the predetermined priority is the notification mode corresponding to the time, the electronic device 10 may maintain or change the notification mode to the sound mode.

In this case, the electronic device 10 may display a notification mode icon 851 displayed in a notification window 850 in accordance with the changed notification mode.

FIG. 9 is a block diagram illustrating an electronic device 901 in a network environment 900 according to various embodiments.

The electronic device 901 of FIG. 9 may include the electronic device 10 of FIG. 1 and/or the wearable device 20 of FIG. 1. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thererto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas. In such a case, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device 10 according to an embodiment may include a communication module 990 (e.g., communication circuitry or a transceiver), a processor 920, and a memory 930, and the memory 930 may store instructions configured to cause, when executed, the processor 920 to establish communication with the wearable device 20 through the communication module 990, and, when identifying a change in an operation state of the wearable device 20, change from a first notification mode of the electronic device 10 to a second notification mode according to the identified operation state of the wearable device 20.

For the electronic device 10 according to an embodiment, the operation state of the wearable device 20 may include at least one of a state regarding whether a user wears the wearable device 20 and a state of communication between the wearable device 20 and the electronic device 10.

For the electronic device 10 according to an embodiment, the electronic device 10 may further include a display (for example, a display device 960), and the instructions may cause the processor 920 to control the display device 960 to display information regarding a change in a notification mode of the electronic device 10 on the display device 960.

For the electronic device 10 according to an embodiment, the instructions may cause the processor 920 to, when it is identified that the information displayed on the display 960 is acknowledged, change from the first notification mode of the electronic device 10 to the second notification mode.

For the electronic device 10 according to an embodiment, the instructions may cause the processor 920 to display a user interface including information for guiding setting of a type of a notification mode corresponding to a location of the electronic device 10.

For the electronic device 10 according to an embodiment, the instructions may cause the processor 920 to, when the notification mode corresponding to the location of the electronic device 10 is different from the notification mode corresponding to the operation state of the wearable device 20, determine the notification mode of the electronic device 10 through a predetermined priority.

For the electronic device 10 according to an embodiment, the instructions may cause the processor 920 to display a user interface including information for guiding setting of a type of a notification mode corresponding to a time.

For the electronic device 10 according to an embodiment, the instructions cause the processor 920 to, when the notification mode corresponding to the time is different from the notification mode corresponding to the operation state of the wearable device 20, determine the notification mode of the electronic device 10 through a predetermined priority.

The electronic device 10 according to an embodiment may include the communication module 990, the processor 920, and the memory 930, and the memory 930 may store instructions configured to cause, when executed, the processor 920 to establish communication with a wearable device 20 through the communication module 990, and, when it is identified that the wearable device 20 is removed from a user's body part, change from a first notification mode of the electronic device 10 to a second notification mode.

For the electronic device 10 according to an embodiment, the first notification mode may be a mute mode, and the second notification mode may be at least one of a vibration mode or a sound mode.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   communication circuitry;
   a display;
   at least one processor; and
   a memory,
   wherein the memory stores instructions configured to, when executed, cause the at least one processor to:
   establish communication with a wearable device through the communication circuitry,
   after establishing communication with the wearable device, identify a change in an operation state of the wearable device from a first operation state of the wearable device to a second operation state of the wearable device, the operation state of the wearable device comprising a state of communication between the wearable device and the electronic device, the change in the operation state of the wearable device comprising the wearable device changing from a state of regular transmission/reception of data to a state in which regular transmission/reception ends,
   based on the identifying of the change in the operation state of the wearable device to the second operation state of the wearable device, change from a first notification mode of the electronic device to a second notification mode of the electronic device, and
   control the display to display a second icon indicating the second notification mode by changing a first icon indicating the first notification mode displayed on the display into the second icon indicating the second notification mode.

2. The electronic device of claim 1, wherein the operation state of the wearable device further comprises a state regarding whether a user is wearing the wearable device.

3. The electronic device of claim 1, wherein the instructions, when executed, further cause the at least one processor to control the display to display information regarding a change in a notification mode of the electronic device on the display.

4. The electronic device of claim 3, wherein the instructions, when executed, further cause the at least one processor to, in response to identifying that the information displayed on the display is acknowledged, change from the first notification mode of the electronic device to the second notification mode.

5. The electronic device of claim 1, wherein the instructions, when executed, further cause the at least one processor to display a user interface including information for guiding setting of a type of a notification mode corresponding to at least one of a location of the electronic device or a time.

6. The electronic device of claim 5, wherein the instructions, when executed, further cause the at least one processor to, when the notification mode corresponding to the location of the electronic device is different from the notification mode corresponding to the operation state of the wearable device, determine the notification mode of the electronic device through a predetermined priority.

7. The electronic device of claim 5, wherein the instructions, when executed, further cause the at least one processor to, when the notification mode corresponding to the time is different from the notification mode corresponding to the operation state of the wearable device, determine the notification mode of the electronic device through a predetermined priority.

8. The electronic device of claim 1, wherein the instructions, when executed, further cause the at least one processor to, in response to identifying that the wearable device is removed from a user's body part, change from the first notification mode of the electronic device to the second notification mode.

9. The electronic device of claim 8,
   wherein the first notification mode comprises a mute mode, and
   wherein the second notification mode comprises at least one of a vibration mode or a sound mode.

10. The electronic device of claim 1, wherein the first notification mode and the second notification mode differently notify a user of an event generated inside the electronic device or a signal received from outside the electronic device, in response to the event being generated inside the electronic device or the signal being received from outside the electronic device.

11. A method of controlling an electronic device, the method comprising;
    after establishing communication with a wearable device, identifying a change in an operation state of the wearable device from a first operation state of the wearable device to a second operation state of the wearable device, the operation state of the wearable device comprising a state of communication between the wearable device and the electronic device, the change in the operation state of the wearable device comprising the wearable device changing from a state of regular transmission/reception of data to a state in which regular transmission/reception ends;
    based on the identifying of the change in the operation state of the wearable device to the second operation state of the wearable device, changing from a first notification mode of the electronic device to a second notification mode of the electronic device; and
    displaying, on a display of the electronic device, a second icon indicating the second notification mode by changing a first icon indicating the first notification mode displayed on the display into the second icon indicating the second notification mode.

12. The method of claim 11, wherein the operation state of the wearable device further comprises a state regarding whether a user is wearing the wearable device.

13. The method of claim 11, further comprising displaying information regarding a change in a notification mode of the electronic device on the display of the electronic device.

14. The method of claim 11, further comprising displaying a user interface including information for guiding a setting of a type of notification mode to correspond to at least one of a location of the electronic device or a time.

15. The method of claim 14, further comprising determining a notification mode of the electronic device through a predetermined priority in a state in which a notification mode corresponding to the location of the electronic device is different from a notification mode corresponding to the operation state of the wearable device.

16. The method of claim 14, further comprising determining a notification mode of the electronic device through a predetermined priority in a state in which a notification mode corresponding to the time is different from a notification mode corresponding to the operation state of the wearable device.

17. A method of controlling an electronic device, the method comprising:
- after establishing communication with a wearable device, identifying whether a state of communication between the wearable device and the electronic device changes, changing the state of communication between the wearable device and the electronic device comprising the wearable device changing from a state of regular transmission/reception of data to a state in which regular transmission/reception ends;
- based on identifying that the state of communication between the wearable device and the electronic device has changed, changing from a first notification mode of the electronic device to a second notification mode of the electronic device; and
- displaying, on a display of the electronic device, a second icon indicating the second notification mode by changing a first icon indicating the first notification mode displayed on the display into the second icon indicating the second notification mode.

18. The method of claim 17,
- wherein the first notification mode comprises a mute mode, and
- wherein the second notification mode comprises at least one of a vibration mode or a sound mode.

19. The method of claim 17, further comprising transmitting, by the wearable device to the electronic device, health-related data of a user.

20. The method of claim 17, further comprising:
- changing an operating state of the wearable device; and
- transmitting, by the wearable device to the electronic device, information related to the changed operation state of the wearable device,
- wherein, in case the established communication between the electronic device and the wearable device becomes disconnected, identifying, by the electronic device, that a change in the operation state of the wearable device has occurred.

21. A computer program product comprising a non-transitory computer-readable recording medium having recorded thereon a plurality of instructions which, when executed, instruct at least one processor of an electronic device to:
- after establishing communication with a wearable device, identify a change in an operation state of the wearable device from a first operation state of the wearable device to a second operation state of the wearable device, the operation state of the wearable device comprising a state of communication between the wearable device and the electronic device, the change in the operation state of the wearable device comprising the wearable device changing from a state of regular transmission/reception of data to a state in which regular transmission/reception ends;
- based on the identifying of the change in the operation state of the wearable device to the second operation state of the wearable device, change from a first notification mode of the electronic device to a second notification mode of the electronic device; and
- displaying, on a display of the electronic device, a second icon indicating the second notification mode by changing a first icon indicating the first notification mode displayed on the display into the second icon indicating the second notification mode.

* * * * *